United States Patent
Swaminathan (10) Patent No.: US 9,961,591 B2
(45) Date of Patent: May 1, 2018

(54) OPTIMIZATIONS TO CIRCUIT-SWITCHED FALLBACK (CSFB) PROCEDURE

(71) Applicant: QUALCOMM Incorporated, San Diego, CA (US)

(72) Inventor: Arvind Swaminathan, San Diego, CA (US)

(73) Assignee: QUALCOMM Incorported, San Diego, CA (US)

( * ) Notice: Subject to any disclaimer, the term of this patent is extended or adjusted under 35 U.S.C. 154(b) by 159 days.

(21) Appl. No.: 13/654,030

(22) Filed: Oct. 17, 2012

(65) Prior Publication Data

US 2013/0094446 A1 Apr. 18, 2013

Related U.S. Application Data

(60) Provisional application No. 61/548,640, filed on Oct. 18, 2011.

(51) Int. Cl.
  *H04W 80/04* (2009.01)
  *H04W 36/00* (2009.01)
  *H04W 8/24* (2009.01)

(52) U.S. Cl.
  CPC ......... *H04W 36/0022* (2013.01); *H04W 8/24* (2013.01)

(58) Field of Classification Search
  CPC . H04W 36/00; H04W 36/14; H04W 36/0022; H04W 68/00; H04W 76/026; H04W 4/00; H04W 64/00; H04W 8/08; H04L 12/26; H04L 12/66
  USPC ..... 370/220, 221, 331, 354, 338; 455/432.1, 455/414.1, 415, 417, 434, 456.1, 435.2, 455/515
  See application file for complete search history.

(56) References Cited

U.S. PATENT DOCUMENTS

| | | | | |
|---|---|---|---|---|
| 8,547,969 | B2 * | 10/2013 | Watfa | H04W 76/027 370/353 |
| 2010/0098023 | A1 * | 4/2010 | Aghili | H04W 36/0022 370/331 |

(Continued)

FOREIGN PATENT DOCUMENTS

| | | |
|---|---|---|
| EP | 1679927 A2 | 7/2006 |
| EP | 2320698 A1 | 5/2011 |

(Continued)

OTHER PUBLICATIONS

Nokia Siemens Networks et al: "1xRTT CSFB with PS handover", 3GPP Draft; S2-093532_IXCSFB With PS HO-CR-FINAL, 3rd Generaltion Project (3GPP), Mobile COmpetence Centre, 650, Route Des Lucioles ; F-06921 Sophia-Anti Polis Cedex ; France, no. Tallinn ; May 5, 2009, May 5, 2009 (May 5, 2009) , XP050346597, [retrieved on May 5, 2009].

(Continued)

*Primary Examiner* — Andrew Chriss
*Assistant Examiner* — Rasha Fayed
(74) *Attorney, Agent, or Firm* — Patterson & Sheridan, L.L.P.

(57) ABSTRACT

Circuit-switched fallback (CSFB) is a technique to deliver voice-services to a mobile, when the mobile is camped in a long-term evolution (LTE) network. Certain aspects of the present disclosure provide techniques that may help reduce delays in call setup related to CSFB and, in some cases, avoid unnecessary paging.

24 Claims, 10 Drawing Sheets

(56) References Cited

U.S. PATENT DOCUMENTS

| | | | |
|---|---|---|---|
| 2010/0120432 A1* | 5/2010 | Watfa | H04W 36/0022 455/436 |
| 2010/0172301 A1* | 7/2010 | Watfa | H04W 36/0022 370/328 |
| 2011/0103277 A1* | 5/2011 | Watfa | H04W 36/0022 370/310 |
| 2011/0110302 A1* | 5/2011 | Faurie | H04W 36/0022 370/328 |
| 2011/0149907 A1 | 6/2011 | Olsson et al. | |
| 2011/0194427 A1* | 8/2011 | Shirota | H04W 36/0022 370/252 |
| 2011/0216645 A1* | 9/2011 | Song | H04W 36/0022 370/216 |
| 2011/0217952 A1* | 9/2011 | Nordstrand | H04W 36/0038 455/411 |
| 2011/0312321 A1 | 12/2011 | Ramachandran et al. | |
| 2012/0015646 A1* | 1/2012 | Burbidge | H04W 36/0022 455/422.1 |
| 2012/0015650 A1* | 1/2012 | Pudney | H04W 8/08 455/434 |
| 2012/0028661 A1 | 2/2012 | Fang et al. | |
| 2012/0052885 A1* | 3/2012 | Zhang | H04W 76/026 455/458 |
| 2012/0069731 A1* | 3/2012 | Tooher | H04W 76/026 370/221 |
| 2012/0087340 A1* | 4/2012 | Yang | H04W 36/0022 370/331 |
| 2012/0231793 A1* | 9/2012 | Wu | H04W 36/0022 455/436 |
| 2012/0307735 A1* | 12/2012 | Aghili | H04W 36/0022 370/328 |
| 2013/0083775 A1* | 4/2013 | Sun | H04W 60/00 370/331 |
| 2013/0259001 A1* | 10/2013 | Keller | H04W 76/027 370/331 |

FOREIGN PATENT DOCUMENTS

| | | |
|---|---|---|
| KR | 20110042360 A | 4/2011 |
| WO | 2010080802 A1 | 7/2010 |
| WO | 2010129932 A1 | 11/2010 |
| WO | WO-2011053824 A2 | 5/2011 |
| WO | WO-2011120030 A1 | 9/2011 |

OTHER PUBLICATIONS

Partial International Search Report—PCT/US2012/060718—ISA/EPO—Jan. 2, 2013.

"3rd Generation Partnership Project; Technical Specification Group Services and System Aspects; General Packet Radio Service (GPRS) enhancements for Evolved Universal Terrestrial Radio Access Network (E-UTRAN) access (Release 8)", 3GPP Standard; 3GPP TS 23.401, 3rd Generation Partnership Project (3GPP), Mobile Competence Centre ; 650, Route Deslucioles ; F-06921 Sophia-Antipolis Cedex; France, vol. SA WG2, No. V8.14.0, Jun. 10, 2011 (Jun. 10, 2011), pp. 1-242, XP050552989.

"3rd Generation Partnership Project; Technical Specification Group Services and System Aspects; Circuit Switched (CS) fallback, in Evolved Packet System (EPS); Stage 2 (Release 10)", 3GPP Standard; 3GPP TS 23.272, 3rd Generation Partnership Project (3GPP), Mobile Competence Centre ; 650, Route Des Lucioles ; F-06921 Sophiaantipolis Cedex ; France, vol. SA WG2, No. V10.5.0, Aug. 24, 2011 (Aug. 24, 2011), pp. 1-79, XP050553745, [retrieved on Aug. 24, 2011].

International Search Report and Written Opinion—PCT/US2012/060718—ISA/EPO—dated Mar. 25, 2013.

Qualcomm Europe: "Service type in Service Request", 3GPP Draft; S2-085374 (Service Type), 3rd Generation Partnership Project (3GPP), Mobile Competence Centre ; 650, Route Deslucioles ; F-06921 Sophia-Antipolis Cedex; France, vol. Sa WG2, no. Sophia; Aug. 19, 200, Aug. 19, 2008 (Aug. 19, 2008), XP050267415.

Qualcomm Incorporated: "Assessment of CSFB performance and prospective gain of CSFB Enhancements" 3GPP 3rd Generation Partnership Project (3GPP), Mobile Competence Centre;650, Route Des Lucioles ; F-06921, Sophia-Antipolis Cedex ; France, vol. SA WG2, no. San Francisco, USA; TSG SA WG2, S2-101308, Feb. 22-26, 2010, XP05043383.

Docomo N., et al., "Analysis on inter-RAT ping pong handover," 3GPP Draft; R3-102843, 3rd Generation Partnership Project (3GPP), Mobile Competence Centre ; 650, Route Des Lucioles ; F-06921 Sophia-Antipolis Cedex ; France, vol. RAN WG3, no. Xi'an; Oct. 2, 2010, Oct. 2, 2010 (Oct. 2, 2010), XP050453645.

3GPP, "On impacts to the 3GPP2 Stack of Potential Dual-rx Based 1xCSFB Solutions", 3GPP TSG-RAN Meeting #46, RP-091350, Dec. 1-4, 2009, pp. 1-6.

NTT Docomo, "CR on 24.008—CSFB timer", 3GPP TSG CT WG1Meeting#55bis, T24.801, C1-083661, V8.0.0, Oct. 6-10, 2008, pp. 1-8.

Ericsson, et. al., "Way forward with Dual Rx UE support of 1xRTT CSFB", 3GPP TSG RAN Meeting #46 RP-091236, Nov. 26, 2009.

* cited by examiner

FIG. 11 ific challenges> # OPTIMIZATIONS TO CIRCUIT-SWITCHED FALLBACK (CSFB) PROCEDURE

CLAIM OF PRIORITY UNDER 35 U.S.C. § 119

The present Application for Patent claims priority to U.S. Provisional Application No. 61/548,640, filed Oct. 18, 2011, and assigned to the assignee hereof and hereby expressly incorporated by reference herein.

BACKGROUND

Field

Aspects of the present disclosure relate generally to wireless communications, and more particularly, to techniques for improving a circuit-switched fallback (CSFB) user experience.

Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include code division multiple access (CDMA) networks, time division multiple access (TDMA) networks, frequency division multiple access (FDMA) networks, orthogonal FDMA (OFDMA) networks, and single-carrier FDMA (SC-FDMA) networks.

Circuit-switched fallback (CSFB) is a technique to deliver voice-services to a mobile, for example, when the mobile is camped in a long-term evolution (LTE) network. Certain challenges are presented that result in delays in call setup related to CSFB.

SUMMARY

Certain aspects of the present disclosure provide a method, corresponding apparatus and computer program product for wireless communications at a user equipment (UE) capable of communicating via first and second radio access technologies (RATs). The method generally includes transmitting a UE capability message with one or more parameters selected to indicate capabilities that result in a reduced delay in processing an extended service request (ESR) message by a base station of the first RAT, receiving services via the base station of the first RAT, receiving, via a base station of the second RAT, a paging message targeting the UE, and transmitting the extended service request (ESR) message to the base station of the first RAT to request suspension of context for the UE in the first RAT.

Certain aspects of the present disclosure provide a method, corresponding apparatus and computer program product for wireless communications at a user equipment (UE) capable of communicating via first and second radio access technologies (RATs). The method generally includes receiving services via a base station of the first RAT, receiving, via a base station of the second RAT, a paging message targeting the UE, transmitting an extended service request (ESR) message to the base station of the first RAT to request suspension of context for the UE in the first RAT, determining a probability is relatively high that the ESR message was successfully received at the base station of the first RAT, and performing registration in the second RAT, in response to the determination, without waiting for a response to the ESR message.

Certain aspects of the present disclosure provide a method, corresponding apparatus and computer program product for wireless communications at a user equipment (UE) capable of communicating via first and second radio access technologies (RATs). The method generally includes receiving services via a base station of the first RAT, receiving, via a base station of the second RAT, a paging message targeting the UE and transmitting a Short Message Service (SMS) message using the second RAT, the SMS message containing an extended service request (ESR) message to the base station of the first RAT to request suspension of context for the UE in the first RAT.

Certain aspects of the present disclosure provide a method, corresponding apparatus and computer program product for wireless communications at a user equipment (UE) capable of communicating via first and second radio access technologies (RATs). The method generally includes receiving services via a base station of the first RAT, receiving, via a base station of the second RAT, a paging message targeting the UE and transmitting an extended service request (ESR) message to the base station of the first RAT to request suspension of context for the UE in the first RAT, wherein the ESR message comprises a cause code indicating cause information other than occurrence of a mobile originated (MO) or mobile terminated (MT) call.

Certain aspects of the present disclosure provide a method, corresponding apparatus and computer program product for wireless communications at a user equipment (UE) capable of communicating via first and second radio access technologies (RATs). The method generally includes receiving services via a base station of the first RAT, receiving, via a base station of the second RAT, a paging message targeting the UE, transmitting an extended service request (ESR) message to the base station of the first RAT to request suspension of context for the UE in the first RAT, and delaying processing the paging message while awaiting an indication the ESR message was successfully received at the first base station.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Circuit-switched fallback (CSFB) is a technique to deliver voice-services to a mobile, when the mobile is camped in a long-term evolution (LTE) network. This may be required when the LTE network does not support voice services natively. The LTE network and a 1× network (e.g., CDMA or GSM) may be connected using a tunnel interface. The UE may register with the 1× network while on the LTE network by exchanging messages with the 1× core network over the tunnel interface. If a user makes a mobile originating (MO) call, or receives a mobile terminating (MT) call, the UE may inform the LTE network that the UE is leaving for the call by initiating a call setup procedure.

However, there may be undesirable delays associated with CSFB. Certain aspects of the present disclosure provide techniques that may be utilized to help reduce or, in some cases, limit such delays.

The techniques described herein may be used for various wireless communication networks such as code division multiple access (CDMA), time division multiple access (TDMA), frequency division multiple access (FDMA), orthogonal FDMA (OFDMA), single carrier FDMA (SC-FDMA) and other networks. The terms "network" and "system" are often used interchangeably. A CDMA network may implement a radio access technology (RAT) such as universal terrestrial radio access (UTRA), cdma2000, etc. UTRA includes wideband CDMA (WCDMA) and other variants of CDMA. cdma2000 covers IS-2000, IS-95 and IS-856 standards. IS-2000 is also referred to as 1× radio transmission technology (1×RTT), CDMA2000 1×, etc. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP long-term evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and RATs mentioned above as well as other wireless networks and RATs. For clarity, certain aspects of the techniques are described below for LTE and 1×RTT.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
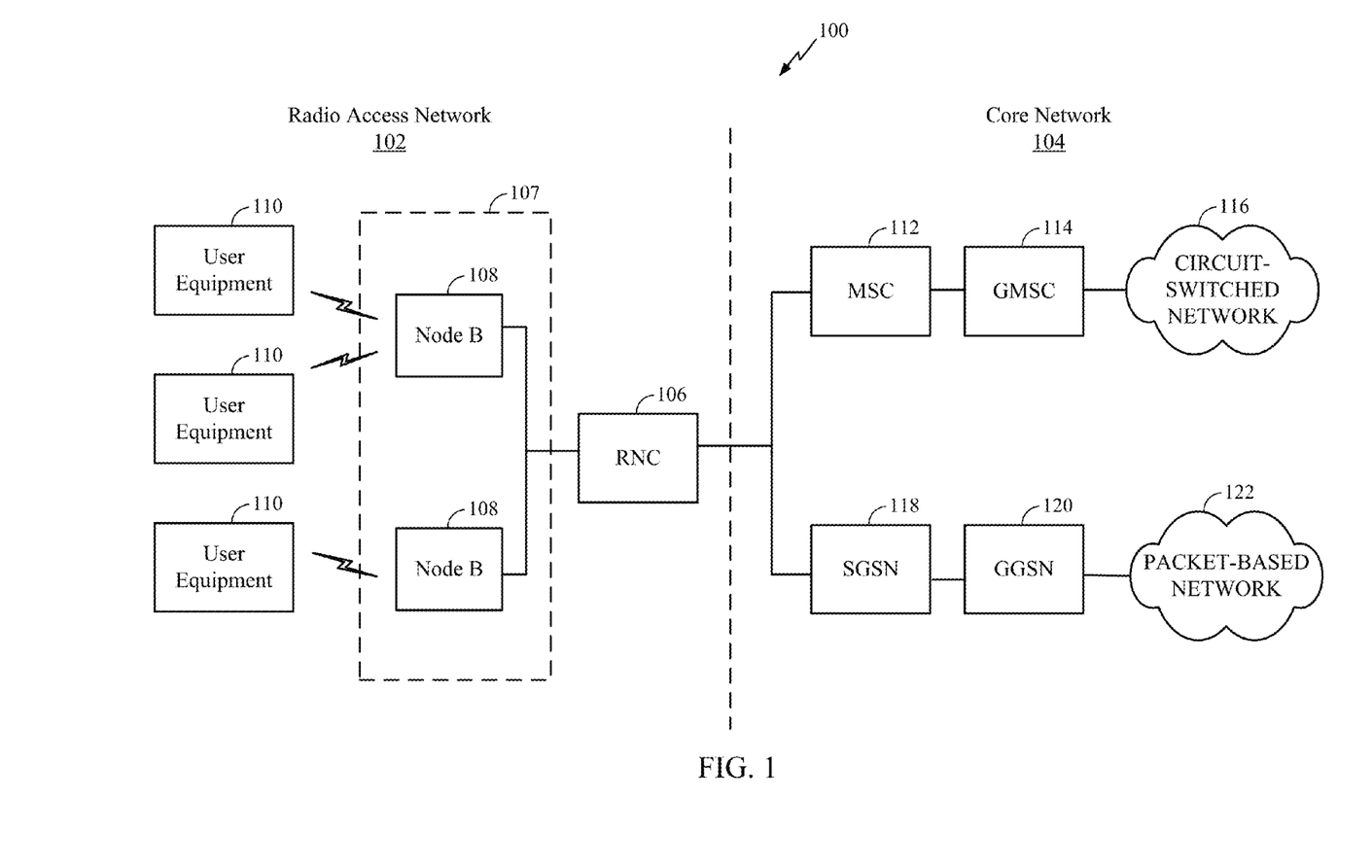
FIG. 1 illustrates an exemplary deployment in which multiple wireless networks have overlapping coverage.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a radio access network (RAN) 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs.

A UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc.

Upon power up, UE 110 may search for wireless networks from which it can receive communication services. If more than one wireless network is detected, then a wireless network with the highest priority may be selected to serve UE 110 and may be referred to as the serving network. UE 110 may perform registration with the serving network, if necessary. UE 110 may then operate in a connected mode to actively communicate with the serving network. Alternatively, UE 110 may operate in an idle mode and camp on the serving network if active communication is not required by UE 110.

UE 110 may be located within the coverage of cells of multiple frequencies and/or multiple RATs while in the idle mode. For LTE, UE 110 may select a frequency and a RAT to camp on based on a priority list. This priority list may include a set of frequencies, a RAT associated with each frequency, and a priority of each frequency. For example, the priority list may include three frequencies X, Y and Z. Frequency X may be used for LTE and may have the highest priority, frequency Y may be used for GSM and may have the lowest priority, and frequency Z may also be used for GSM and may have medium priority. In general, the priority list may include any number of frequencies for any set of RATs and may be specific for the UE location. UE 110 may be configured to prefer LTE, when available, by defining the priority list with LTE frequencies at the highest priority and with frequencies for other RATs at lower priorities, e.g., as given by the example above.

UE 110 may operate in the idle mode as follows. UE 110 may identify all frequencies/RATs on which it is able to find a "suitable" cell in a normal scenario or an "acceptable" cell in an emergency scenario, where "suitable" and "acceptable" are specified in the LTE standards. UE 110 may then camp on the frequency/RAT with the highest priority among all identified frequencies/RATs. UE 110 may remain camped on this frequency/RAT until either (i) the frequency/RAT is no longer available at a predetermined threshold or (ii) another frequency/RAT with a higher priority reaches this threshold. This operating behavior for UE 110 in the idle mode is described in 3GPP TS 36.304, entitled "Evolved Universal Terrestrial Radio Access (E-UTRA); User Equipment (UE) procedures in idle mode," which is publicly available.

UE 110 may be able to receive packet-switched (PS) data services from LTE network 102 and may camp on the LTE network while in the idle mode. LTE network 102 may have limited or no support for voice-over-Internet protocol (VoIP), which may often be the case for early deployments of LTE networks. Due to the limited VoIP support, UE 110 may be transferred to another wireless network of another RAT for voice calls. This transfer may be referred to as circuit-switched (CS) fallback. UE 110 may be transferred to a RAT that can support voice service such as 1×RTT, WCDMA, GSM, etc. For call origination with CS fallback, UE 110 may initially become connected to a wireless network of a source RAT (e.g., LTE) that may not support voice service. The UE may originate a voice call with this wireless network and may be transferred through higher-layer signaling to another wireless network of a target RAT that can support the voice call. The higher-layer signaling to transfer the UE to the target RAT may be for various procedures, e.g., connection release with redirection, PS handover, etc.

Figure 2:
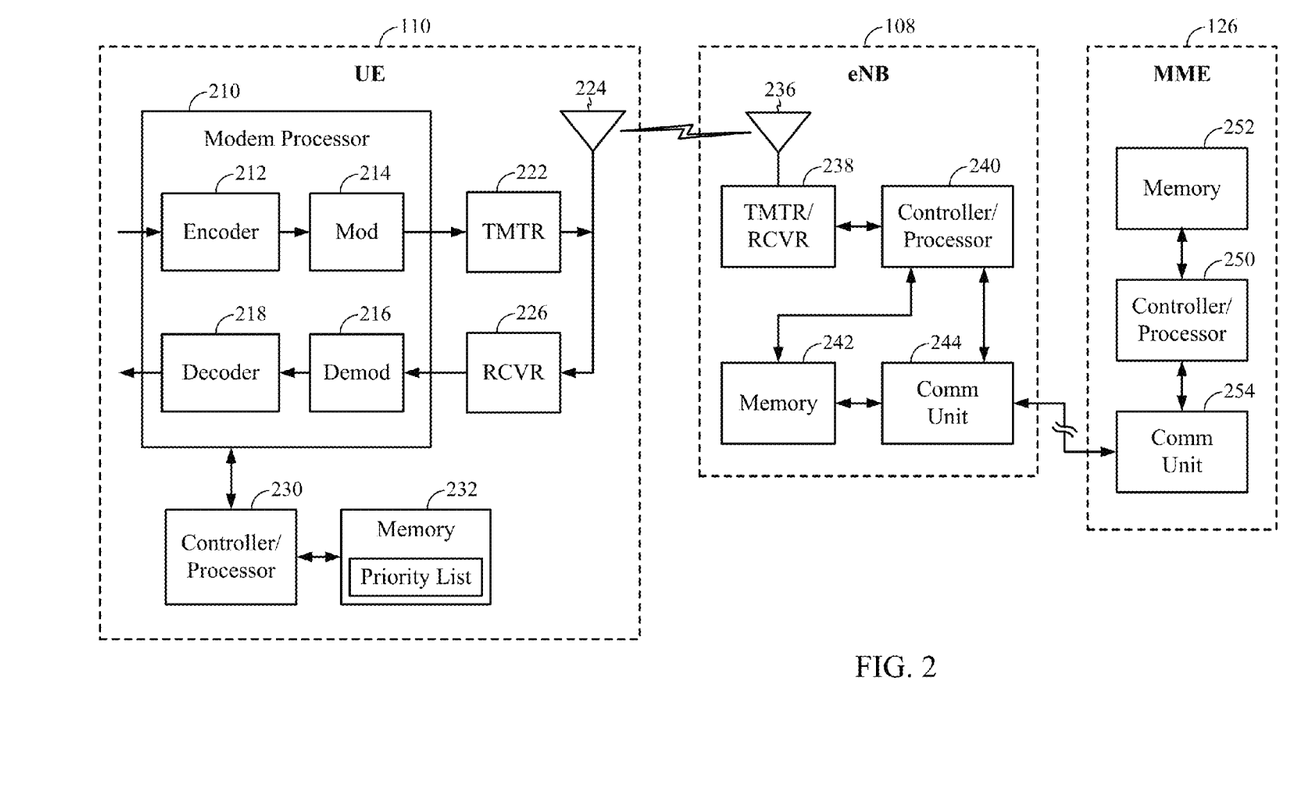
FIG. 2 illustrates a block diagram of a user equipment (UE) and other network entities.

FIG. 2 shows a block diagram of a design of UE 110, eNB 108, and MME 126. At UE 110, an encoder 212 may receive traffic data and signaling messages to be sent on the uplink. Encoder 212 may process (e.g., format, encode, and interleave) the traffic data and signaling messages. A modulator (Mod) 214 may further process (e.g., symbol map and modulate) the encoded traffic data and signaling messages and provide output samples. A transmitter (TMTR) 222 may condition (e.g., convert to analog, filter, amplify, and frequency upconvert) the output samples and generate an uplink signal, which may be transmitted via an antenna 224 to eNB 108.

On the downlink, antenna 224 may receive downlink signals transmitted by eNB 108 and/or other eNBs/base stations. A receiver (RCVR) 226 may condition (e.g., filter, amplify, frequency downconvert, and digitize) the received signal from antenna 224 and provide input samples. A demodulator (Demod) 216 may process (e.g., demodulate) the input samples and provide symbol estimates. A decoder 218 may process (e.g., deinterleave and decode) the symbol estimates and provide decoded data and signaling messages sent to UE 110. Encoder 212, modulator 214, demodulator 216, and decoder 218 may be implemented by a modem processor 210. These units may perform processing in accordance with the RAT (e.g., LTE, 1xRTT, etc.) used by the wireless network with which UE 110 is in communication.

A controller/processor 230 may direct the operation at UE 110. Controller/processor 230 may also perform or direct other processes for the techniques described herein. Controller/processor 230 may also perform or direct the processing by UE 110 in FIGS. 3 and 4. Memory 232 may store program codes and data for UE 110. Memory 232 may also store a priority list and configuration information.

At eNB 108, a transmitter/receiver 238 may support radio communication with UE 110 and other UEs. A controller/processor 240 may perform various functions for communication with the UEs. On the uplink, the uplink signal from UE 110 may be received via an antenna 236, conditioned by receiver 238, and further processed by controller/processor 240 to recover the traffic data and signaling messages sent by UE 110. On the downlink, traffic data and signaling messages may be processed by controller/processor 240 and conditioned by transmitter 238 to generate a downlink signal, which may be transmitted via antenna 236 to UE 110 and other UEs. Controller/processor 240 may also perform or direct other processes for the techniques described herein. Controller/processor 240 may also perform or direct the processing by eNB 102 in FIGS. 3 and 4. Memory 242 may store program codes and data for the base station. A communication (Comm) unit 244 may support communication with MME 126 and/or other network entities.

At MME 126, a controller/processor 250 may perform various functions to support communication services for UEs. Controller/processor 250 may also perform or direct the processing by MME 126 in FIGS. 3 and 4. Memory 252 may store program codes and data for MME 126. A communication unit 254 may support communication with other network entities.

FIG. 2 shows simplified designs of UE 110, eNB 108, and MME 126. In general, each entity may include any number of transmitters, receivers, processors, controllers, memories, communication units, and other type suitable components.

Optimizations to S102-Less CSFB Procedure

The techniques presented herein may be considered improvements or optimizations of to address inherent limitations in existing procedures (e.g., traditional 1xCSFB) that can increase call setup delay. In some cases, however, the techniques may be considered new procedures are presented.

Figure 3:
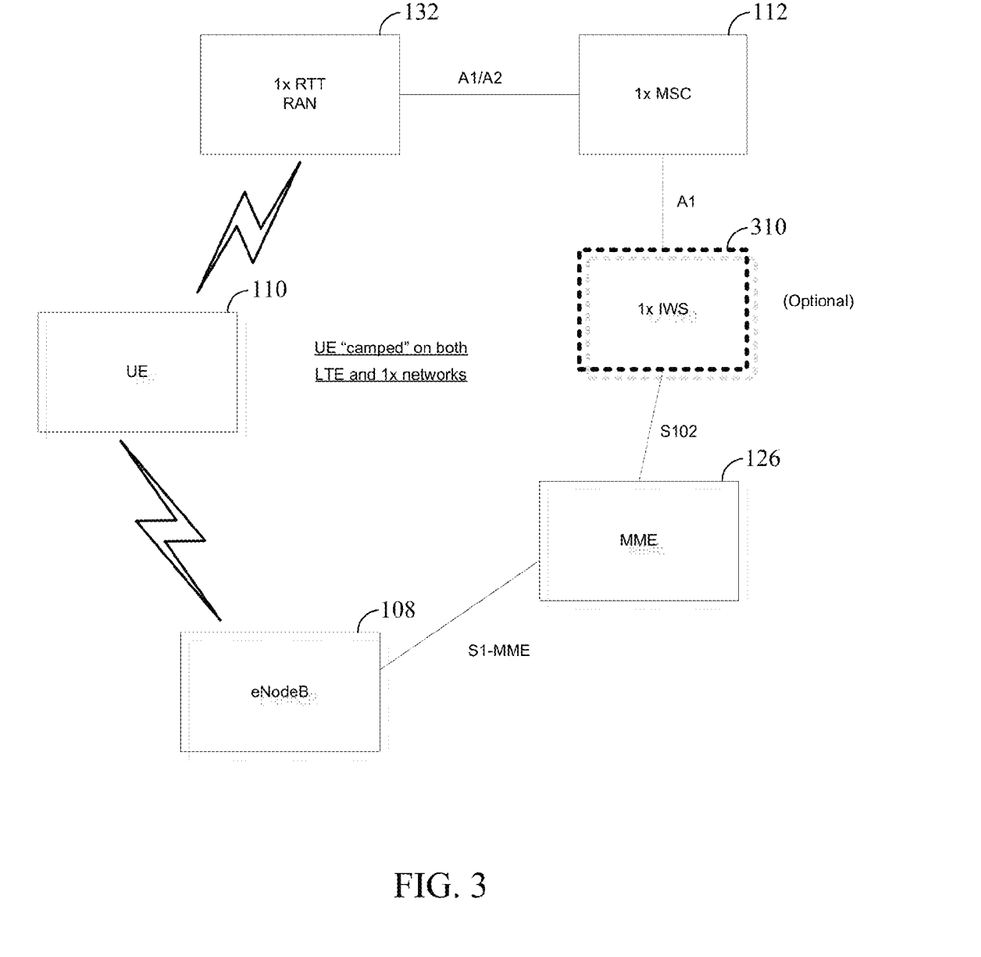
FIG. 3 illustrates an example system with a multi-mode UE camped on two different radio access technology (RAT) networks, according to certain aspects of the present disclosure.

In one scenario, illustrated in FIG. 3, a multi-mode UE 110 may register with multiple RAT networks (e.g., via a 1xRAN base station 132 and an LTE eNB108) by performing signaling over the native RAT networks, respectively. The UE 110 may then listen for pages in one RAT (e.g., 1x pages) while receiving services (but idle) in the other RAT. The separate receivers may also allow the UE to listen for pages in one RAT while receiving data traffic in another RAT.

In some cases, when receiving a 1x page, a UE may send a message (e.g., an extended service request or ESR message) to request release of the UE context in the LTE network. In effect, the ESR may cause the LTE network to suspend data transmission to the UE while it is in a call. This may be helpful to prevent the LTE network from attempting to page the UE while it is processing a mobile originated (MO) or mobile terminated (MT) voice call, a short messaging service (SMS) message, or 1x registration.

One of the main reasons to send ESR, thus, may be to suspend the UE context on LTE when UE is on a 1x voice call. Hence, if there is incoming LTE data during this time, the LTE network will not waste resources by paging the UE. When the UE completes the process (e.g., the call terminates), it may send a tracking area update to the LTE network to resume data services.

How the network responds to this ESR message may depend on how the network is configured. For example, some networks may utilize a interface 310 that provides a "backhaul" link between the two networks (via A1 link with the 1xRAT network and via an S102 link with the LTE network), some systems may wish to achieve inter-operation without such an interface ("S102-less" operation).

In some cases more current or "updated" networks may be able to interpret ESR messages in a manner described herein to help reduce call setup delay as presented herein. Even in cases where a network simply supports "traditional"1x CSFB, the techniques presented herein may be applied to help reduce call setup delay.

According to certain aspects, processing delay may be reduced by selecting particular parameter values transmitted in a UE capability message. The UE capability message may be transmitted in response to a network request, for example, to determine what RATs a UE is capable of supporting and in what manner.

Figure 4:
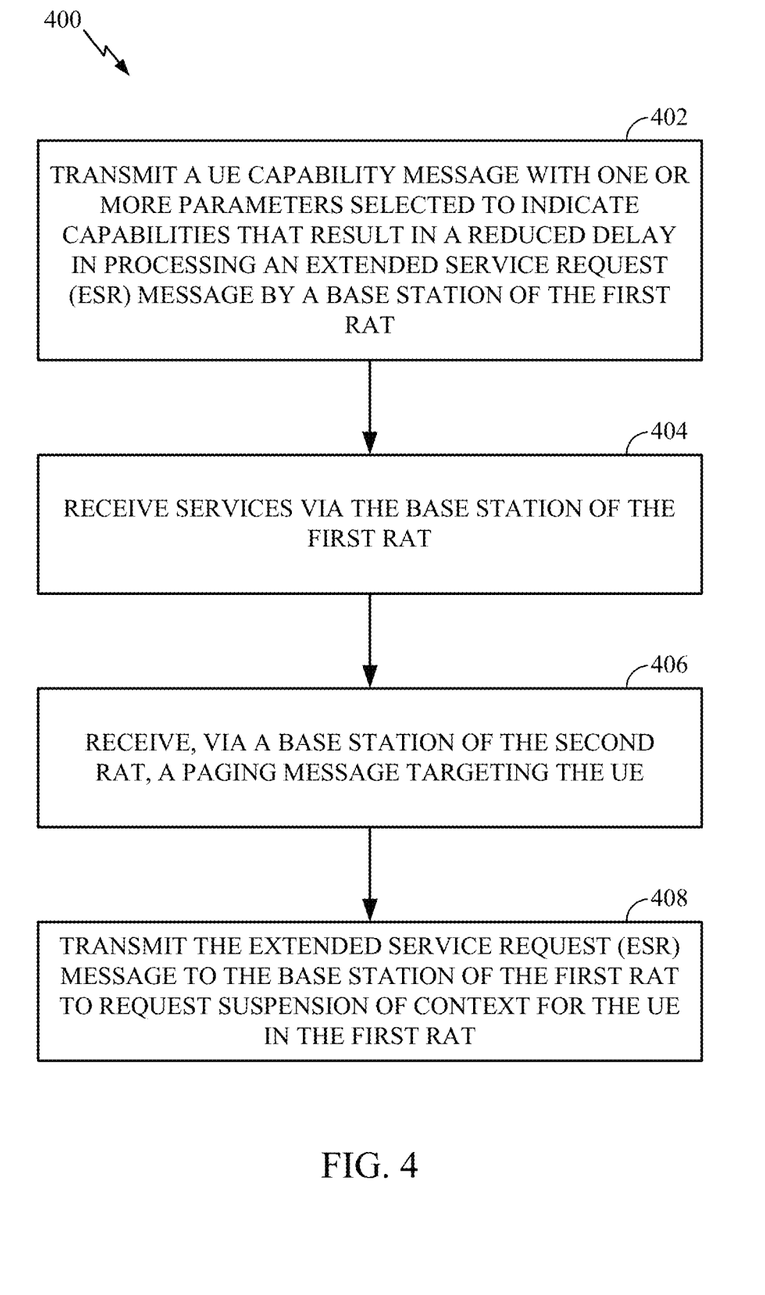
FIG. 4 illustrates example operations that may be performed to reduce call setup delays, according to certain aspects of the present disclosure.

FIG. 4 illustrates example operations 400 that may be used to reduce processing delay via a UE capability message, in accordance with aspects of the present disclosure. The operations 400 may be performed, for example, by a UE capable of operating in 1x and LTE.

The operations 400 begin, at 402, by transmitting a UE capability message with one or more parameters selected to indicate capabilities that result in a reduced delay in processing an extended service request (ESR) message by a base station of the first RAT. At 404, the UE receives services via the base station of the first RAT and, at 406, the UE receives, via a base station of the second RAT, a paging message targeting the UE. At 408, the UE transmits the ESR message to the base station of the first RAT to request suspension of context for the UE in the first RAT.

Figure 5:
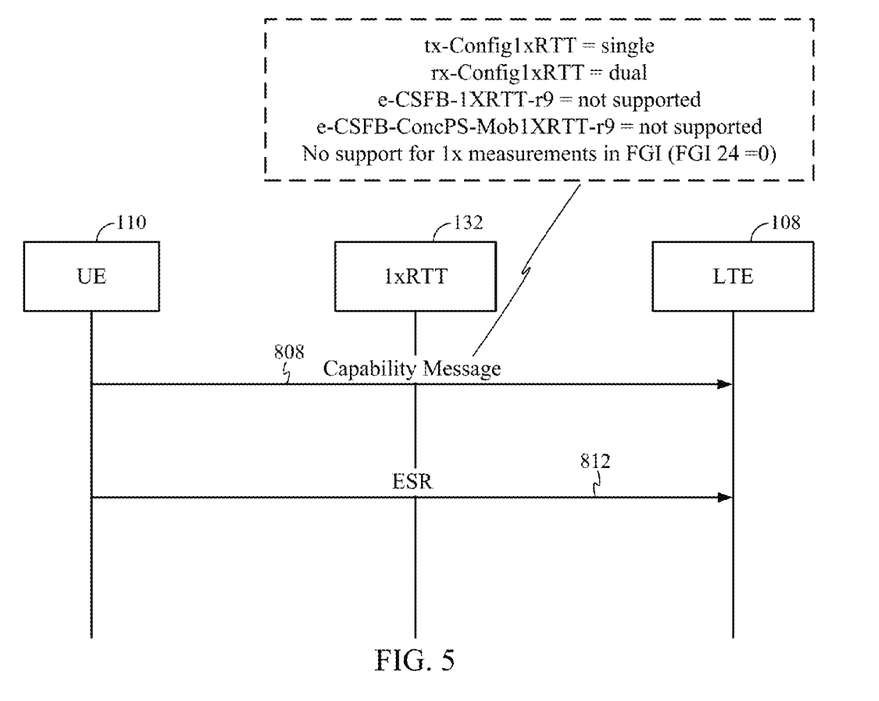
FIG. 5 illustrates an example exchange of messages between a UE and base stations of different RAT networks, according to certain aspects of the present disclosure.

FIG. 5 is an example "call flow" diagram illustrating an exchange of messages between a UE 110, operating in accordance with FIG. 4, and 1x and LTE RAT networks. As illustrated, in an effort to reduce (or at least constrain) call set up delay, the following parameter values may be sent in the UE capability message:

tx-Config1xRTT=single
rx-Config1xRTT=dual
e-CSFB-1xRTT-r9=not supported
e-CSFB-ConcPS-Mob1xRTT-r9=not supported
No support for 1x measurements in FGI (FGI 24=0)

In this example, the first two fields above may indicate the dual-Rx capability of the UE (e.g., meaning the UE is capable of simultaneously receiving from both RATs). Thus, by interpreting these fields, a network that has been upgraded to understand "S102-less CSFB" may respond to an ESR in an optimum way.

As illustrated in FIG. 5, the network may recognize the UE has the capability to receive pages from 1x while receiving services in LTE and immediately release a connection and the UE may promptly proceed to establish a 1x call. The network may or may not send a response to the ESR (not shown in the example illustrated in FIG. 5), depending on the particular configuration. As will be described below, in some cases, the UE may not wait for a response to the ESR before beginning 1x registration, thereby speeding call setup.

The last 3 fields above may allow handling a "regular" 1xCSFB (e.g., in a non-upgraded network) in an optimum fashion. For example, it may still treat the ESR as MO/MT 1xCSFB procedure, but may reduce delays. For example, delays may be reduced by avoiding network triggering of 1x measurements and e1xCSFB procedure because the last 3 fields above indicate the UE does not support such measurements (even though it may actually be capable of such measurements).

As noted above, one reason to send an ESR is to suspend the UE context on LTE when UE is on a 1x voice call so, if there is incoming LTE data during this time, the LTE network will not waste resources by paging the UE.

According to certain aspects, in order to decrease the call setup delay, it may be best if the UE leaves the LTE network as soon it has determined, with relatively high probability, that the ESR has reached the network. Hence, instead of waiting for a network response to the ESR, the UE can use the receipt of an acknowledgement message (e.g., the RLC Ack) for the protocol data unit (e.g., the RLC PDU) containing at least a portion of (e.g., the last part) of the ESR as sufficient proof that ESR has been received.

Figure 6:
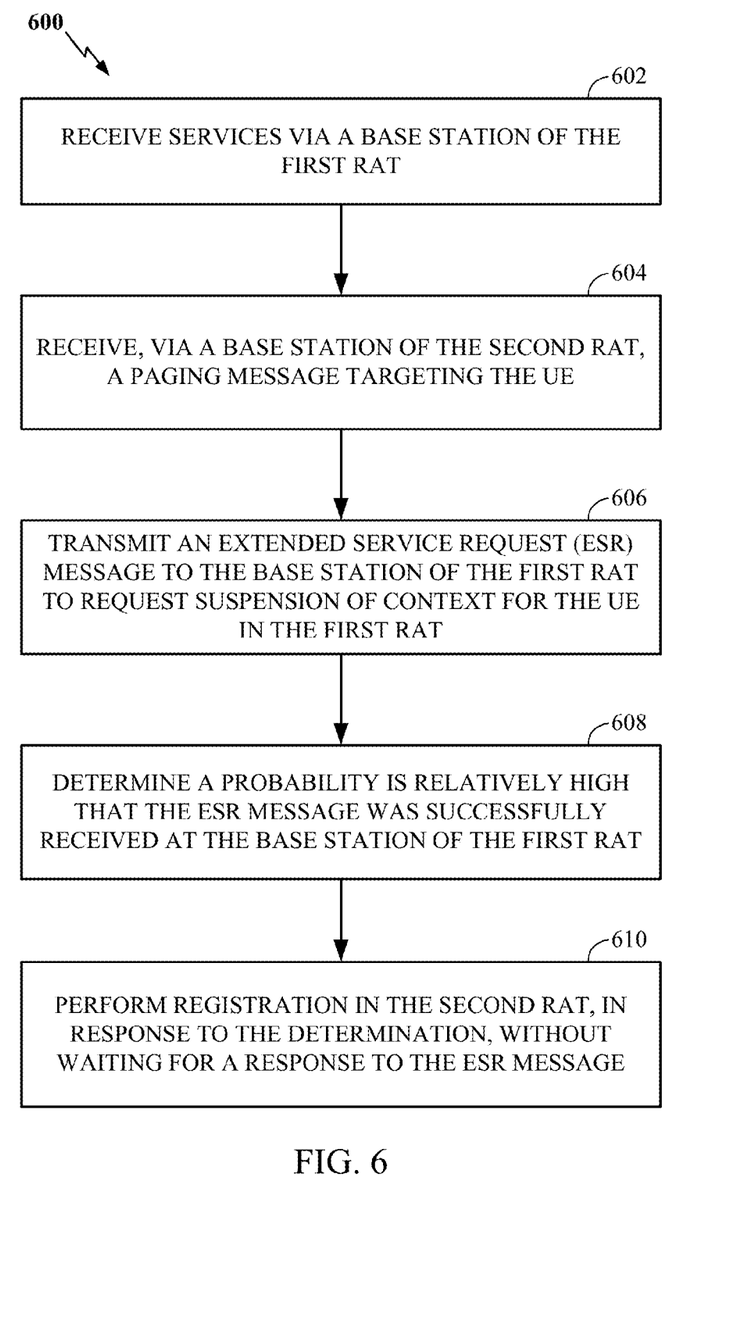
FIG. 6 illustrates example operations that may be performed to reduce call setup delays, according to certain aspects of the present disclosure.

FIG. 6 illustrates example operations 600 that may be used to reduce processing delay by a UE, in accordance with aspects of the present disclosure.

The operations 600 begin, at 602, by receiving services via a base station of the first RAT. At 604, the UE receives, via a base station of the second RAT, a paging message targeting the UE. At 606, the UE transmits an extended service request (ESR) message to the base station of the first RAT to request suspension of context for the UE in the first RAT. At 608, the UE determines a probability is relatively high that the ESR message was successfully received at the base station of the first RAT and, at 610, performs registration in the second RAT, in response to the determination, without waiting for a response to the ESR message.

Figure 7:
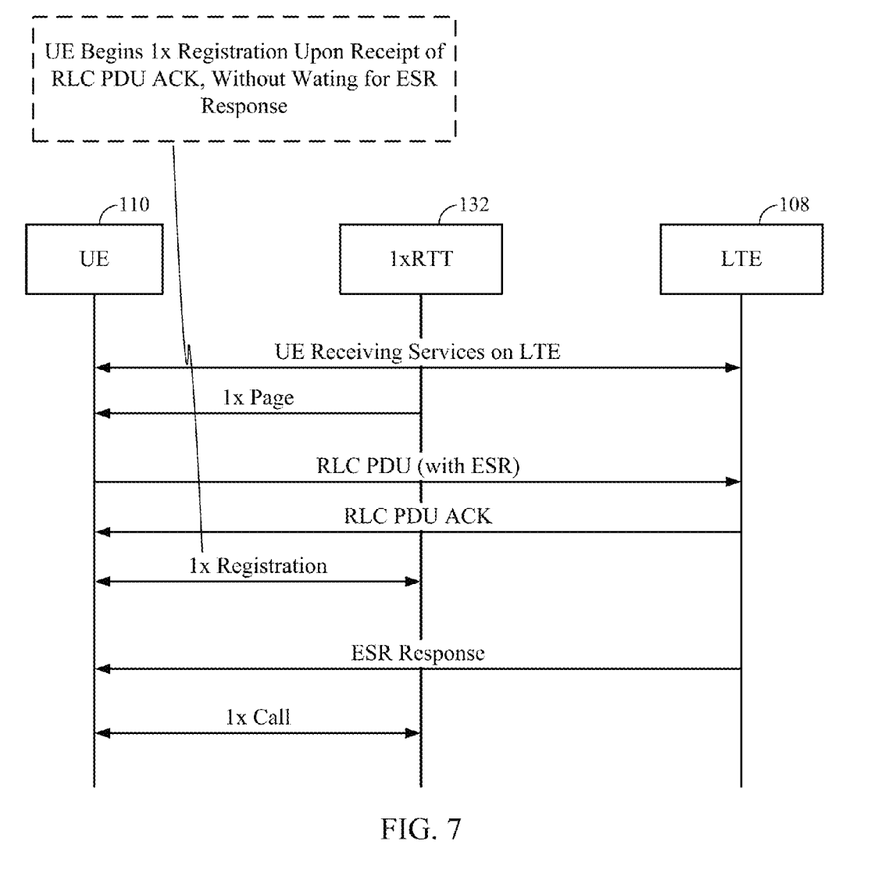
FIG. 7 illustrates an example exchange of messages between a UE and base stations of different RAT networks, according to certain aspects of the present disclosure.

FIG. 7 is an example call flow diagram of a UE 110, operating in accordance with FIG. 6. As illustrated in this example, as soon as the UE 110 receives an RLC-Ack after ending an RLC PDU containing the ESR, the UE may assume with a relatively high probability that the LTE network has successfully received the ESR. Thus, the UE may start the 1x access procedure for the MO/MT call as soon as it receives the RLC-Ack.

Since leaving early in this manner may be interpreted as a radio link failure (RLF) on the LTE eNB, the optimization illustrated in FIG. 7 may be restricted to certain scenarios. For example, this optimization may be restricted to MT calls (because there are network timers) or if the network is a "non-updated" (e)1xCSFB network (e.g., does not understand dual-Rx CSFB).

According to certain aspects, a "network triggered" ESR may be caused by the UE. In such cases, however, this may require a change to current standards for ESR processing. As noted above, one reason to delay a mobile originated (MO) or mobile terminated (MT) call and spend time attempting to suspend UE context on LTE (via an ESR) is to avoid wasteful paging.

According to certain aspects, such suspension of UE context may be achieved via a network triggered procedure. This network triggered procedure may be initiated by an ESR sent in a short message service (SMS) message by the UE to a special server configured to relay the ESR to the LTE network.

Figure 8:
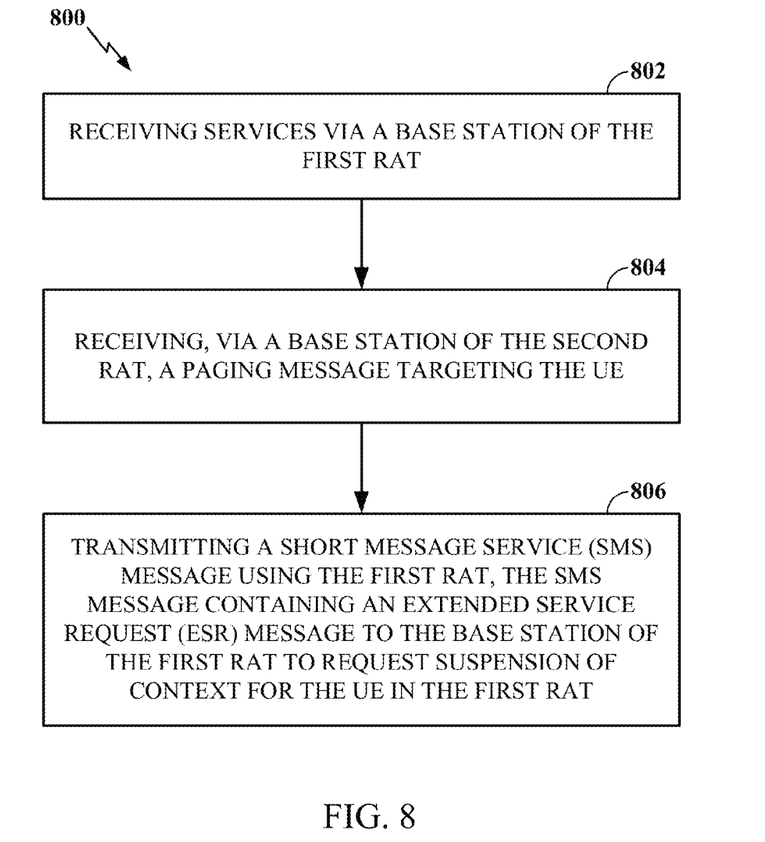
FIG. 8 illustrates example operations that may be performed to reduce call setup delays, according to certain aspects of the present disclosure.

FIG. 8 illustrates example operations 800 that may be used to reduce processing delay by triggering a ESR procedure via an SMS message, in accordance with aspects of the present disclosure.

The operations 800 begin, at 802, by receiving services via a base station of the first RAT. At 804, the UE receives, via a base station of the second RAT, a paging message targeting the UE. At 804, the UE transmits a Short Message Service (SMS) message using the second RAT, the SMS message containing an extended service request (ESR) message to the base station of the first RAT to request suspension of context for the UE in the first RAT.

Figure 9:
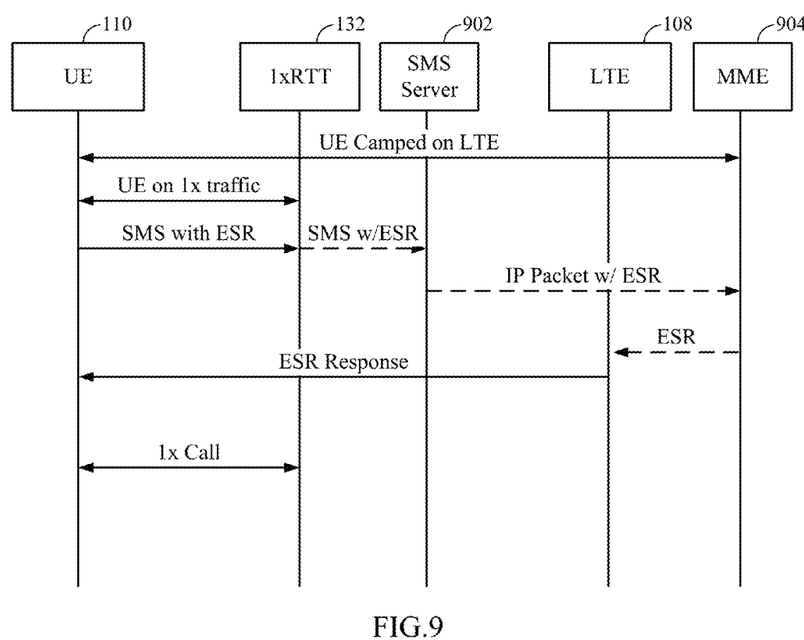
FIG. 9 illustrates an example exchange of messages between a UE and base stations of different RAT networks, according to certain aspects of the present disclosure.

FIG. 9 is an example call flow diagram of a UE 110, operating in accordance with FIG. 8. As illustrated, when the UE is "on 1x traffic" and receives a page, it may send a SMS message to a special server 902. As illustrated, the SMS message may contain an ESR in the payload and, in some cases, may contain a field providing identification of an MME-ID for an MME 904 for LTE eNB 108 currently serving the UE. The special server 902 may be configured to initiate a network triggered ESR by sending the ESR as an IP packet to the identified MME 904.

An ESR typically contains a field indicating a cause code which provides an indication of the reason or "cause" of the ESR. In a conventional system, the cause code always indicates a mobile originated (MO) or mobile terminated (MT) call.

According to certain aspects of the present disclosure, however, an ESR message may be sent with a cause code indicating something other than an MO/MT call. This different type of cause code may allow a network to recognize the UE is leaving for a particular reason and that the UE has multiple receivers. For example, the UE may send such an ESR message before initiating 1x activity, such as 1x registration, 1xSMS, or Ack on access-channel. The UE may include a cause code that indicates such activities, allowing a network to know why it is leaving LTE.

Figure 10:
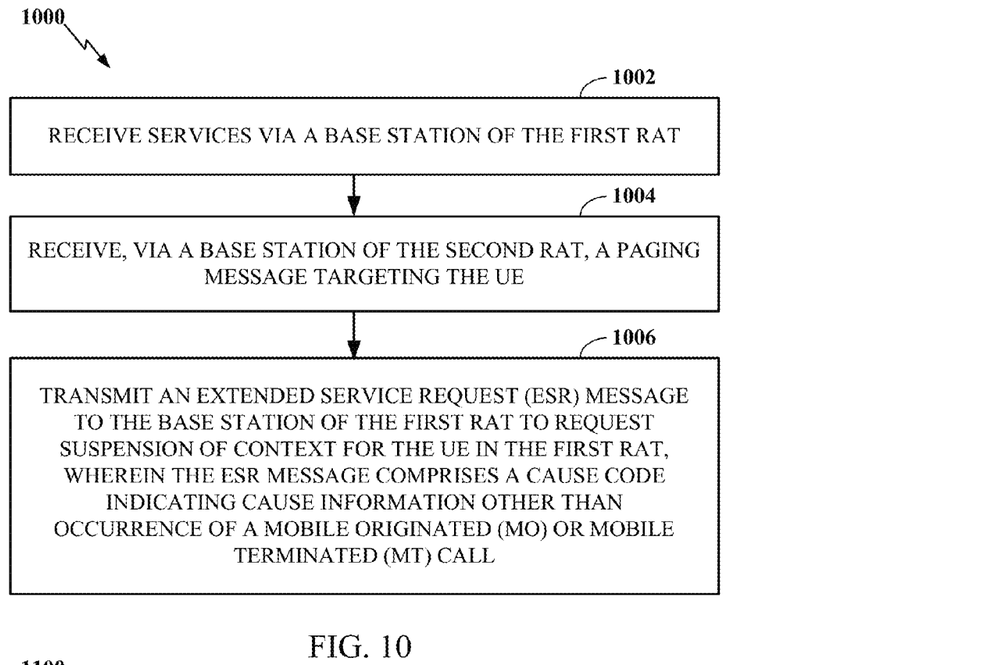
FIG. 10 illustrates example operations that may be performed by a UE to convey an extended service request (ESR) with a different cause code, according to certain aspects of the present disclosure.

FIG. 10 illustrates example operations 1000 for a UE to send an ESR with a different cause code, in accordance with aspects of the present disclosure. The operations 1000 begin, at 1002, by receiving services via a base station of the first RAT. At 1004, the UE receives, via a base station of the second RAT, a paging message targeting the UE. At 1006, the UE transmits an extended service request (ESR) message to the base station of the first RAT to request suspension of context for the UE in the first RAT, wherein the ESR message comprises a cause code indicating cause information other than occurrence of a mobile originated (MO) or mobile terminated (MT) call.

While conventional cause codes may be limited to an indication of a MO or MR call, these additional call codes may allow the network better management. For example, the network may learn the loading due to ESR for SMS/1× registration. This may allow the network to better investigate the benefits of SMS over IMS, S102 tunnel. This may also allow a network to mandate rules on when to send ESR and when not to send ESR. In addition, such a cause code may allow a network that supports both dual-RX CSFB and (e)1×CSFB to better respond to an ESR.

In some cases, "S102-less CSFB" may pose a challenge to handling of MT calls. This may be because a UE may be forced to add a new state to the MT state machine in which it has to wait. This may require changes to "legacy" 1× state machines that have been developed, tested, and proven for some time. Further, the network typically utilizes a page retransmit timer. If an ESR is not fully processed before this timer expires, allowing UE to perform RACH on 1× and send PRM, the UE is paged over a wider 1× area. In the event UE really did receive the page, but ESR processing completes just after this network timer expires, this paging over the wider area is unnecessary.

To address these challenges, the following technique is provided. When a 1× voice page is received, processing of the page may be delayed by some predetermined amount of time while an ESR is sent and processed. If the ESR does not complete before that time, then 1× processing on the UE may take over transmit chain and sends PRM out, in an effort to avoid unnecessary retransmission of the page over a wider 1× area.

Figure 11:
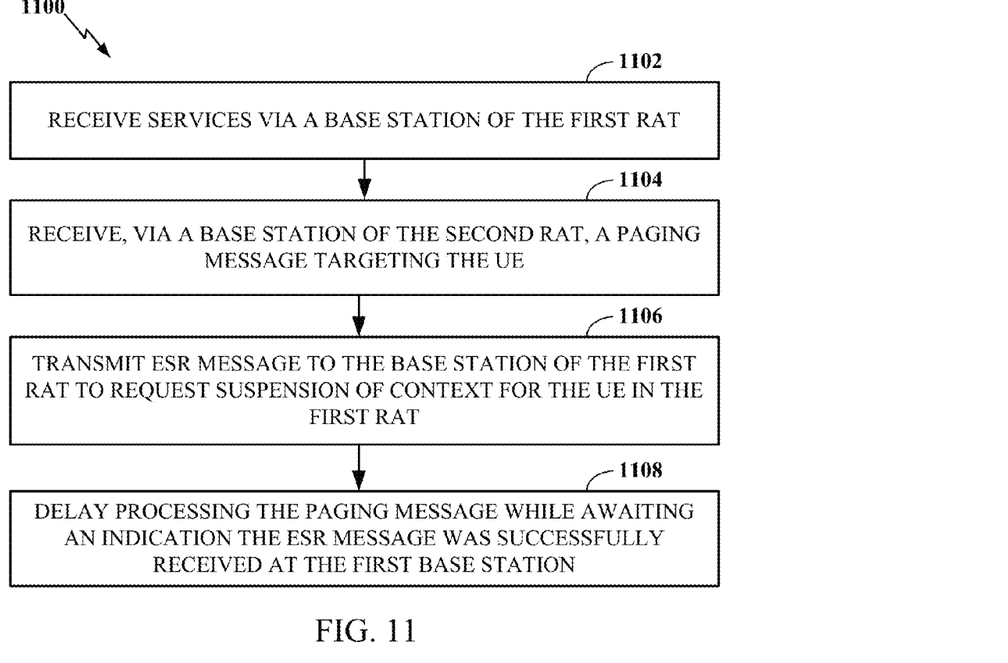
FIG. 11 illustrates example operations that may be performed by a UE to avoid unnecessary wide area paging, according to certain aspects of the present disclosure

FIG. 11 illustrates example operations 1100 for a UE to delay processing a page, in accordance with aspects of the present disclosure. The operations 1100 begin, at 1102, by receiving services via a base station of the first RAT. At 1104, the UE receives, via a base station of the second RAT, a paging message targeting the UE. At 1106, the UE transmits an extended service request (ESR) message to the base station of the first RAT to request suspension of context for the UE in the first RAT. Rather process the paging message immediately, at 1108, the UE delays processing the paging message while awaiting an indication the ESR message was successfully received at the first base station.

As noted above, if the ESR does not complete within a predetermined period of time, then 1× processing on the UE may take over the transmit chain and send a PRM. By setting this predetermined time to a value that allows ESR to be sent out (i.e., RLC Ack received acknowledging receipt of a radio link control (RLC) PDU containing an ESR) with some probability of success in most cases (e.g., 90%), the problem may be addressed for a majority of the cases without significantly impacting the state machine. To avoid network re-page of 1× over wider area, the predetermined amount "X" may be chosen such that;

$$(X + \text{Average 1×RACH time}) < \text{network re-page timeout}$$

In addition, the network may utilize a larger re-page timeout for S102-less CSFB UEs. In any case, once the predetermined time has expired, the UE may proceed to process the 1× page.

As discussed above, techniques provided herein may allow a multi-mode UE to reduce call setup processing delays in networks that support circuit switched fallback (CSFB) and, in some cases, may help avoid unnecessary paging.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented in any suitable means, such as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications at a user equipment (UE) capable of communicating via first and second radio access technologies (RATs), the method comprising:
receiving services via a base station of the first RAT;
receiving, via a base station of the second RAT, a paging message targeting the UE; and
transmitting a Short Message Service (SMS) message using the second RAT, the SMS message containing an extended service request (ESR) message to the base station of the first RAT to request suspension of context for the UE in the first RAT.

2. The method of claim 1, wherein the SMS message comprises an identification of a specified mobility management entity (MME).

3. The method of claim 2, wherein the SMS message is transmitted to a particular server configured to initiate a network triggered ESR by sending the ESR message as an IP packet to the identified MME.

4. The method of claim 1, wherein the ESR message comprises one or more parameters selected to reduce a delay in processing the ESR message.

5. An apparatus for wireless communications capable of communicating via first and second radio access technologies (RATs), comprising:
means for receiving services via a base station of the first RAT;
means for receiving, via a base station of the second RAT, a paging message targeting the apparatus; and
means for transmitting a Short Message Service (SMS) message using the second RAT, the SMS message containing an extended service request (ESR) message to the base station of the first RAT to request suspension of context for the apparatus in the first RAT.

6. The apparatus of claim 5, wherein the SMS message comprises an identification of a specified mobility management entity (MME).

7. The apparatus of claim 6, wherein the SMS message is transmitted to a particular server configured to initiate a network triggered ESR by sending the ESR message as an IP packet to the identified MME.

8. The apparatus of claim 5, wherein the ESR message comprises one or more parameters selected to reduce a delay in processing the ESR message.

9. An apparatus for wireless communications capable of communicating via first and second radio access technologies (RATs), comprising:
at least one processor configured to receive services via a base station of the first RAT, receive, via a base station of the second RAT, a paging message targeting the apparatus, and transmit a Short Message Service (SMS) message using the second RAT, the SMS message containing an extended service request (ESR) message to the base station of the first RAT to request suspension of context for the apparatus in the first RAT; and
a memory coupled with the at least one processor.

10. A non-transitory computer readable medium for wireless communications at a user equipment (UE) capable of communicating via first and second radio access technologies (RATs), the non-transitory computer readable medium having instructions stored thereon, the instructions executable by one or more processors for:
receiving services via a base station of the first RAT;
receiving, via a base station of the second RAT, a paging message targeting the UE; and
transmitting a Short Message Service (SMS) message using the second RAT, the SMS message containing an extended service request (ESR) message to the base station of the first RAT to request suspension of context for the UE in the first RAT.

11. A method for wireless communications at a user equipment (UE) capable of communicating via first and second radio access technologies (RATs), the method comprising:
receiving services via a base station of the first RAT;
receiving, via a base station of the second RAT, a paging message targeting the UE;
transmitting an extended service request (ESR) message to the base station of the first RAT to request suspension of context for the UE in the first RAT; and
delaying processing the paging message while awaiting an indication the ESR message was successfully received at the first base station.

12. The method of claim 11, further comprising:
proceeding to process the paging message if a predetermined amount of time has expired prior to receiving an indication the ESR message was successfully received at the first base station.

13. The method of claim 11, further comprising:
proceeding to process the paging message if an indication the ESR message was successfully received at the first base station is received before a predetermined amount of time has expired.

14. The method of claim 12, wherein the predetermined amount of time is based on an expected amount of time to receive an indication the ESR message was successfully received at the first base station.

15. The method of claim 12, wherein the predetermined amount of time is based on an expected amount of time to receive a response to the ESR.

16. The method of claim 12, wherein the predetermined amount of time is based on a network re-page timeout value.

17. An apparatus for wireless communications capable of communicating via first and second radio access technologies (RATs), comprising:
   means for receiving services via a base station of the first RAT;
   means for receiving, via a base station of the second RAT, a paging message targeting the apparatus;
   means for transmitting an extended service request (ESR) message to the base station of the first RAT to request suspension of context for the apparatus in the first RAT; and
   means for delaying processing the paging message while awaiting an indication the ESR message was successfully received at the first base station.

18. The apparatus of claim 17, further comprising:
   proceeding to process the paging message if a predetermined amount of time has expired prior to receiving an indication the ESR message was successfully received at the first base station.

19. The apparatus of claim 17, further comprising:
   proceeding to process the paging message if an indication the ESR message was successfully received at the first base station is received before a predetermined amount of time has expired.

20. The apparatus of claim 18, wherein the predetermined amount of time is based on an expected amount of time to receive an indication the ESR message was successfully received at the first base station.

21. The apparatus of claim 18, wherein the predetermined amount of time is based on an expected amount of time to receive a response to the ESR.

22. The apparatus of claim 18, wherein the predetermined amount of time is based on a network re-page timeout value.

23. An apparatus for wireless communications capable of communicating via first and second radio access technologies (RATs), comprising:
   at least one processor configured to receive services via a base station of the first RAT, receive, via a base station of the second RAT, a paging message targeting the apparatus, transmit an extended service request (ESR) message to the base station of the first RAT to request suspension of context for the apparatus in the first RAT, and process the paging message while awaiting an indication the ESR message was successfully received at the first base station; and
   a memory coupled with the at least one processor.

24. A non-transitory computer readable medium for wireless communications at a user equipment (UE) capable of communicating via first and second radio access technologies (RATs), the non-transitory computer readable medium having instructions stored thereon, the instructions executable by one or more processors for:
   receiving services via a base station of the first RAT;
   receiving, via a base station of the second RAT, a paging message targeting the UE;
   transmitting an extended service request (ESR) message to the base station of the first RAT to request suspension of context for the UE in the first RAT; and
   delaying processing the paging message while awaiting an indication the ESR message was successfully received at the first base station.

* * * * *